United States Patent [19]
Schneider

[11] Patent Number: 5,932,149
[45] Date of Patent: Aug. 3, 1999

[54] METHOD AND APPARATUS FOR MANUFACTURING AN OPTICAL CABLE

[75] Inventor: Reiner Schneider, Ebersdorf, Germany

[73] Assignee: Siemens Aktiengesellschaft, Munich, Germany

[21] Appl. No.: 08/797,455

[22] Filed: Feb. 6, 1997

[30] Foreign Application Priority Data

Feb. 13, 1996 [DE] Germany .............................. 196 05 276

[51] Int. Cl.$^6$ ............................................. B29D 11/00
[52] U.S. Cl. ................. 264/1.29; 264/1.28; 264/171.13; 156/166; 156/244.12
[58] Field of Search ..................................... 264/1.1, 1.28, 264/1.29, 171.13; 156/166, 172, 244.12

[56] References Cited

U.S. PATENT DOCUMENTS

| 4,743,085 | 5/1988 | Jenkins et al. . | |
|---|---|---|---|
| 4,886,562 | 12/1989 | Pinson | 264/1.29 |
| 5,283,014 | 2/1994 | Oestreich et al. | 264/1.29 |
| 5,360,497 | 11/1994 | Schneider et al. | 264/1.29 |

*Primary Examiner*—Mathieu D. Vargot
*Attorney, Agent, or Firm*—Hill & Simpson

[57] ABSTRACT

An optical cable has tensile elements and supporting elements embedded in an extruded outside cladding. The tensile elements are hauled-off from a supply reel and introduced into an extruder head serving to manufacture the outside cladding. The supporting elements are manufactured in a coextrusion with the outside cladding by appropriate channels formed in the extruder head.

7 Claims, 3 Drawing Sheets

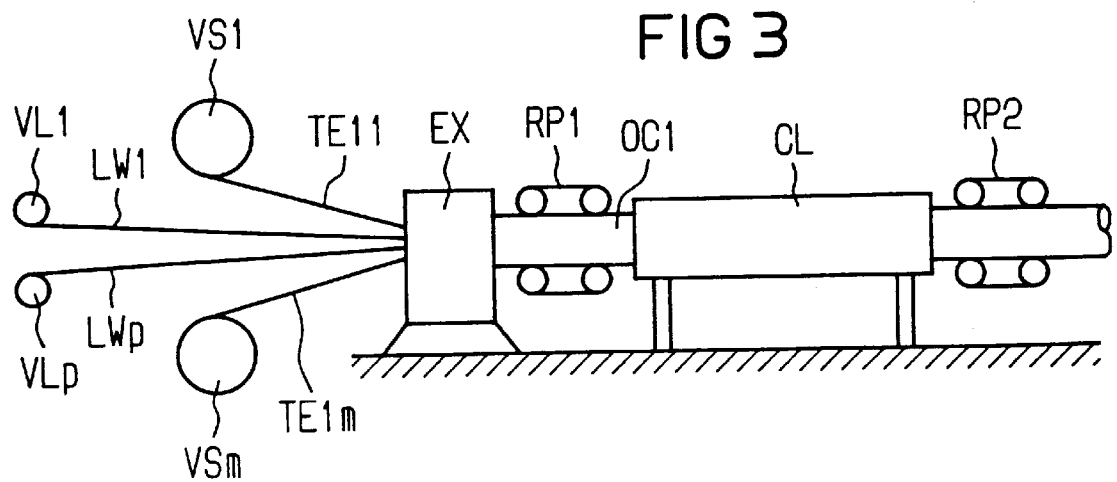
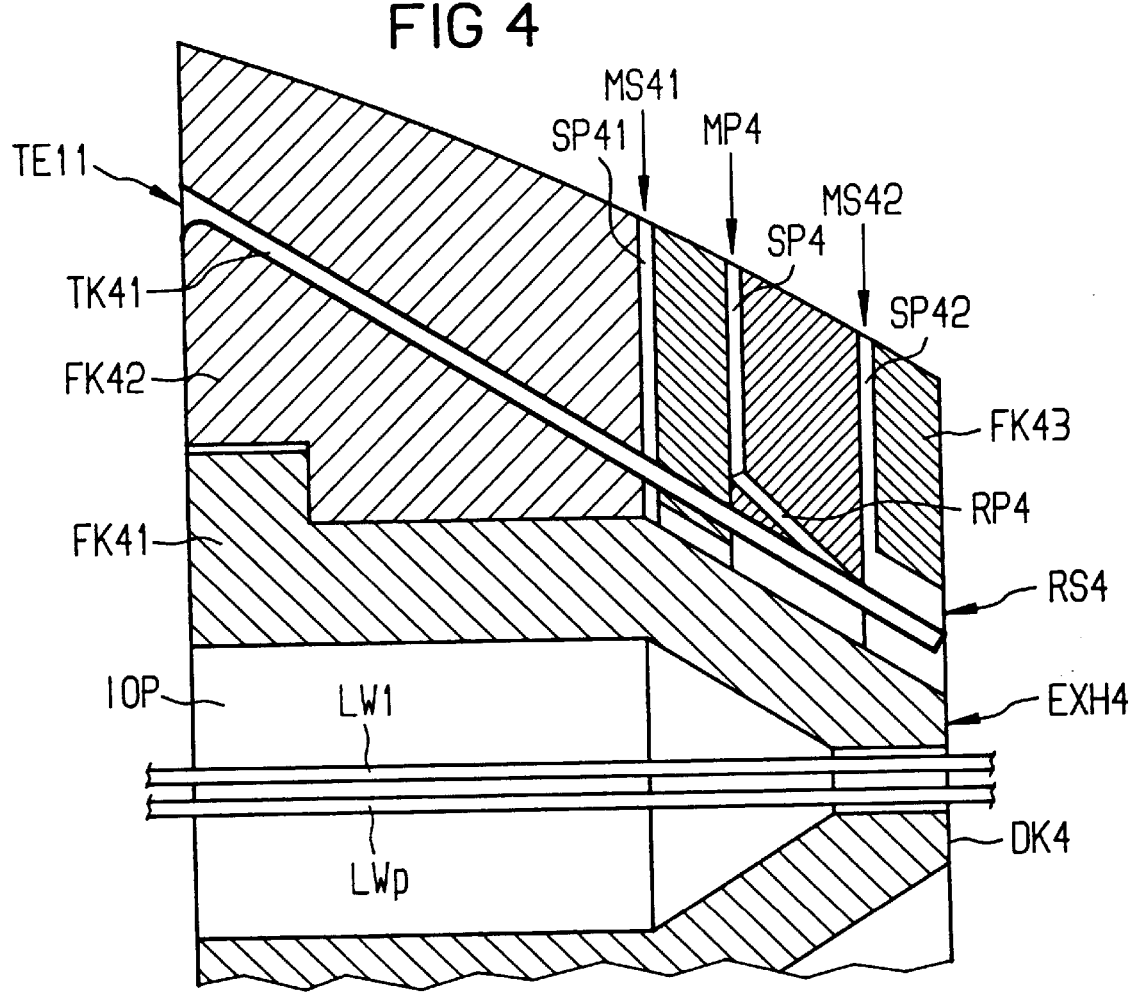

METHOD AND APPARATUS FOR MANUFACTURING AN OPTICAL CABLE

BACKGROUND OF THE INVENTION

The present invention is directed to a method for manufacturing an optical cable, which has an extruded outside cladding in which are embedded both tensile elements and supporting elements.

U.S. Pat. No. 4,743,085, which is incorporated herein by reference thereto, discloses an optical cable in whose outside cladding both tensile elements as well as supporting elements are embedded. The tensile elements are preferably employed for absorbing corresponding longitudinal forces, for example, when laying the cable or during the operation of the cable, for example given overhead cables. By contrast thereto, the supporting elements are important particularly in view of shrink forces of the cable cladding, for example given great changes in the temperature. For example, the tensile elements can be composed of rovings or can be manufactured in the form of yarns or strings. They are relatively flexible, whereas the supporting elements can be composed, for example, of epoxy-cast glass fibers, which are known as GFK elements (fiberglass-reinforced plastic), or FRP elements (fiber-reinforced plastics). These supporting elements are correspondingly stiff, less easily bent and can hardly be compressed at all in the longitudinal direction. The tensile and supporting elements are present as prefabricated elements and must both be introduced into the extruder head so that they can be embedded into the cladding material. This can usually be relatively easily accomplished given the relative flexibility of the tensile elements, whereas the stiff, rather rod-like supporting elements can lead to difficulties in their handling. Moreover, prefabricated supporting elements are generally significantly more expensive than, for example, coextruded supporting elements.

SUMMARY OF THE INVENTION

The present invention is based on the object of simplifying the manufacture of an optical cable. In a method for extruding a jacket or cladding on optical fibers, this object is achieved in that the tensile elements are taken from supply reels and are introduced into the extruder head serving for the manufacture of the outside cladding and in that the supporting elements are manufactured in a coextrusion with the outside cladding.

Since only the tensile elements need to be separately supplied to the extruder in the inventive method, the structure in view of the supply reels is significantly simpler, because only those reels that are required for the tensile elements are needed. The production of the supporting elements that are more difficult to handle in terms of process technology, by contrast, occurs by extrusion, so that the supply reels are not required for these. There is no length limitation for the coextruded supporting elements, which is likewise advantageous. The fashioning of the support elements with an extrusion process is simpler and cheaper because these elements are produced on line only when and where they are, in fact, used. The method is also more beneficial than the delivery of stiff elements, in view of the shaping and embedding into the cladding material. Another advantage of coextruded supporting elements is that these elements are united in a molten form with the sheath into which they are introduced and which is likewise present in an unmolten form. A good adhesion between the supporting elements and the sheath material can thus be achieved.

In order to prevent the supporting elements, as directly shrinking elements during the cooling process, from being excessively compressed or, respectively, crushed, for example due to the shrink process of the cladding material, it is expedient to keep the coextruded support elements until they have hardened or, respectively, until the cladding has hardened under tension. Therefore, the cable cladding or the lead sheath is placed under tension in a cooling means to thus prevent an undesired, excess shrinkage in the longitudinal direction during cooling.

The invention is also directed to an apparatus for the implementation of the inventive method. This apparatus is characterized in that the extruder head is provided in whose inside of the head the light waveguides are supplied through an opening and in that the common annular gap is present surrounding the waveguides into which the guides for the tensile elements and the channels for the supporting elements discharge.

The invention is also directed to an optical cable with tensile elements and supporting elements, which is characterized in that the tensile elements are fashioned skein-like and embedded in the outside cladding and in that the supporting elements are embedded in the outside cladding in an extruded form from a plastic material.

Other advantages and features of the invention will be readily apparent from the following description of the preferred embodiments, the drawings and claims.

BRIEF DESCRIPTION OF THE DRAWINGS

FIG. 3 is a schematic illustration of a fabrication line for manufacturing the cables of the present invention;

FIG. 4 is a partial longitudinal cross sectional view of an extruder head for manufacturing an optical cable in accordance with the present invention.

DESCRIPTION OF THE PREFERRED EMBODIMENTS

Figure 1:
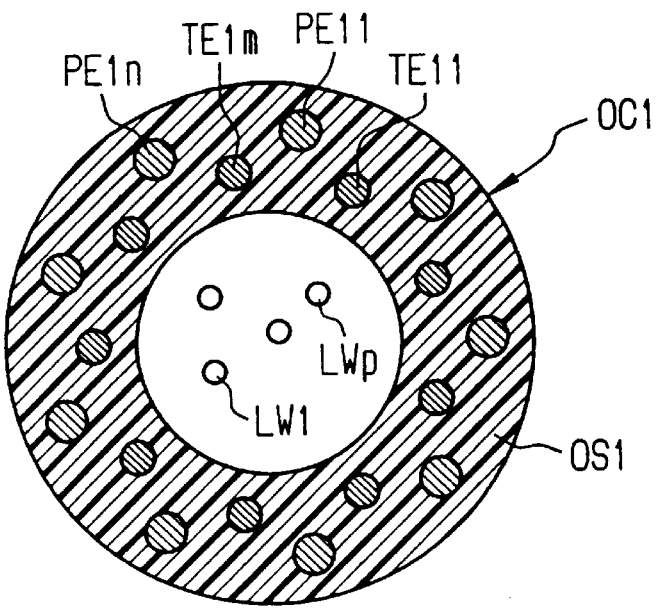
FIG. 1 is a transverse cross sectional view of an embodiment of an optical cable manufactured in accordance with the present invention.

The principles of the present invention are particularly useful when incorporated in a method for manufacturing an optical cable, generally indicated at OC1 in FIG. 1. The optical cable OC1 comprises a single-layer outside cladding OS1. The outside cladding is composed of an extruded plastic material, particularly polyethylene or polypropylene, and contains support elements $PE_{11}$–$PE_{1n}$, which are distributed around the circumference of the cladding. These supporting elements preferably have an approximately circular cross section and are uniformly distributed over the circumference and have diameter values in the range of between 0.1mm and 1.0mm. Since the supporting elements are produced by extrusion, liquid crystal polymers (LCP) materials, polycarbonates or filled thermoplastics are particularly suited for these supporting elements, wherein the matrix material is advantageously selected so that it bonds or sticks well with the material of the outside cladding OS1 and a potentially-provided filler, for example glass, talcum or chalk, improves the stability.

A ply of tensile elements $TE_{11}$–$TE_{1m}$ is provided radially inward from the supporting elements so that it has less of a distance from the cable axis of the cable OC1. These tensile elements are advantageously constructed in the form of skeins, strings, rovings, weaves or the like and are especially flexible, or at least not adequately resistant to crushing. Upon incorporation into the material of the cladding OS1, care should expediently be exercised to see that these elements are not penetrated by the plastic material of the cladding and are continuously baked with these, since they would otherwise lose their easy bendability. It is assumed in the present example that the cross section of the tensile elements TE11–TE1m are likewise selected to be circular, whereas their diameter or, respectively, cross sectional areas are selected smaller than those of the supporting elements. Coming especially into consideration as materials for constructing the tensile elements are fiber-like materials, such as aramid yams, glass yarns, carbon fibers, natural fibers, for example hemp, etc. The light waveguides LW1–LWp provided in the inside can also be embedded in a conventional pasty filling compound, which is not illustrated in the drawings, in order to assure the longitudinal water-tightness.

Figure 2:
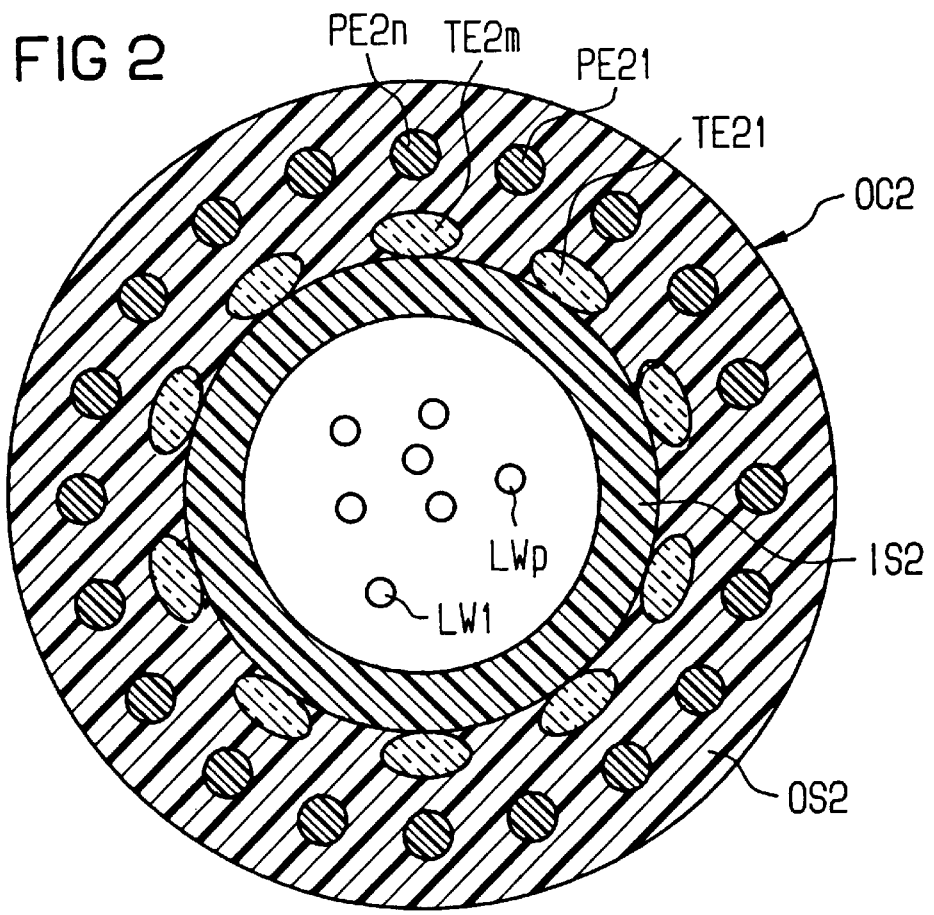
FIG. 2 is a transverse cross sectional view of a second embodiment of an optical cable manufactured in accordance with the present invention.

An embodiment of the cable is generally indicated at OC2 in FIG. 2. The cable OC2 has an inner protective layer or inside layer IS2, which is provided in addition to the actual outside cladding OS2. This inside layer IS2 is expediently likewise composed of an extruded plastic material, wherein the plastic material of the inside layer IS2 advantageously represents a harder material than the plastic material of the outside cladding OS2. As a result thereof, especially good protection can be achieved for the light waveguides LW1–LWp, which are arranged in the interior. When considering materials for the inside layer, preferably PBT (polybutylene terephthalate), PA (polyamide) and PP (polypropylene) are advantageously selected. A two-layer inside sheath IS is also possible, for example of a layer of PBT and a layer of PC (polycarbonates).

The wall thickness of the inside layer IS2 is expediently selected smaller than the outside cladding OS2, for example only one-half through one-fourth of the thickness of the outside cladding. The use of such an additional, protective inside layer IS2 is mainly required when the cable is subjected to great radial stresses or, respectively, when, for example, it is required for assembly reasons.

Supporting elements PE21–PE2n have an approximately circular cross section and lie at an outside portion of the sheath in a uniformly distributed layer. The cross sectional area for the tensile elements TE21–TE2m lying radially inward is selected larger than for the supporting elements PE21–PE2n so that an approximately elliptical cross section is preferably provided. This has the advantage that the expanse in a radial direction can be kept small, the flexibility of the cable is thus not deteriorated and the high tensile stress values can nonetheless be obtained.

It is also possible to provide the supporting elements PE21–PE2n only in the outside cladding OS2, but to use the inside layer IS2 for the acceptance of the tensile elements TE21–TE2m, for example to embed these tensile elements into the inside layer IS2.

Finally, the inside layer IS2 can represent the supporting element and the tensile elements are contained in the outer layer. The inside layer is thereby coextruded via an additional annular channel in the extruder device.

In the present examples according to FIGS. 1 and 2, the supporting elements are arranged radially farther toward the outside respectively relative to the cable axis, and the tensile elements lie radially inward. When good bending properties of the cable are desired, then it can be expedient, contrary to the illustrations of FIGS. 1 and 2, to displace the stiffer supporting elements radially farther toward the inside and to arrange the tensile elements radially farther toward the outside.

In the above examples, the cables OC1 and OC2 have been described as finished cables. Within the scope of the invention, however, it is also possible to utilize the structures of FIGS. 1 and 2 as only parts of an optical cable, for example, rather in the sense of a reinforced multi-fiber loose buffer or the like and to apply additional elements, such as, for example, armoring wires, layered claddings, etc., on the outside of these cables. It is also possible to unite a plurality of the structures shown in FIGS. 1 and 2 into a bundle, for example by stranding, and to surround this bundle with a common outside cladding to form a united cable.

In the manufacturing line illustrated in FIG. 3, supply reels VS1–VSm, on which the flexible tensile elements TE11–TE1m in the form of threads, ropes, rovings, yams or the like, are arranged, are provided for manufacturing a cable according to FIG. 1. The tensile elements are hauled-off from these supply reels and proceed into an extruder EX that serves the purpose of applying the outside cladding OS1 and the supporting elements PE11–PE1n embedded in this cladding. The supporting elements PE11–PE1n are produced from extrudate, and need not be supplied via separate supply reels or the like, but are offered by the extruder EX in coextrusion with the cladding OS1. Supply reel VL1–VLp, from which the light waveguides LW1–LWp can be taken, are also provided. When the cavity for the acceptance of the light waveguide is to be filled with a filling compound, then an appropriate filling means (not shown in detail here) is to be additionally provided, for example a filling needle or the like.

The freshly extruded supporting elements PE11–PE1n have not yet adequately cooled at the output of the extruder in order to exercise a supporting finction. It can therefore be expedient to keep the outside cladding OSI under a tensile stress in a cooling region in order to prevent an excessive reshrinking. Traction devices RP1 and RP2, for example in the form of caterpullers, that will effect the necessary longitudinal stretching of the cable OC1 until a complete curing or hardening has occurred, can be provided, for example, preceding and following a cooling means CL for this purpose.

To extrude the cable OCI of FIG. 1, an extruder head, generally indicated at EXH4 in FIG. 4, is provided. Only the upper portion of this extruder head has been fashioned dynamically balanced in the Figure, although the rest of the head is symmetrical to that portion illustrated. The extruder head EXH4 comprises an inner guide sleeve FK41 that contains an inside opening IOP, which tapers conically in the throughput direction. The light waveguides LW1–LWp as well as any filling compound are introduced through this inside opening IOP and emerge at the right-hand end of the extruder head EXH4. Corresponding, obliquely proceeding bores or, respectively, sleeves through which the tensile elements are introduced into the extruder head EXH4 are also provided and are distributed over the circumference in an additional guide member FK42 in the outside region of the extruder head EXH4. Only one such channel is visible and identified as TK41 in the present sectional view, whereby this serves the purpose of delivering the tensile element TE11.

The guide member FK41 has its outside surface conically tapered in the region of the front annular gap opening, generally indicated as RS4, of the extruder head EXH4 and thereby forms an appropriate discharge channel RS4 for the cladding material. Approximately radially proceeding delivery channels SP41, SP4 and SP42 are also provided in the extruder head EXH4 in the region of a front guide member FK43. A first part MS41 of the cladding material for the outside cladding OS1 is supplied via the channels SP41 ending in an annular gap, namely essentially that part that forms the inside layer of this cladding. The tensile element TE11, or, respectively, the other tensile elements that are not visible here, will be embedded in this cladding material so that the positional distribution of the tensile elements TE11–TE1m shown in FIG. 1 will occur. The delivery of the MP4 that serves for the coextrusion of the supporting elements PE11–PE1n occurs via the channel SP4. The following annular channel at the end of SP4 discharges into a series of individual tubular openings RP4 that proceed approximately radially inward and have the cross section required for the desired diameter of the supporting elements PE11–PE1n. The openings of the tubular sub-sections RP4 discharge into the material flow that is formed by the material sub-flows MS41 and MS42. This material, which is present in fluid or, respectively, molten form, proceeds onto the inner layer of the cladding material OS1 that is formed by the inner material part MS41. It should thereby be taken into consideration that the obliquely inwardly proceeding outlets of the gaps SP4 proceed spatially behind the guide elements TK41 in the present drawing so that, for example, the support element PE11 lies radially outward toward the outside in reality than the neighboring tensile element TE11. Finally, the material MS42 is supplied via the gap SP42 for the outer part of the outside cable cladding OS1, and this, likewise, embeds both the tensile elements TE11–TE1m as well as the supporting elements PE11–PE1n in its soft material flow. A cable cross section that corresponds to FIG. 1 is thus obtained at the output of the annular gap RS4.

The distribution of the tensile elements TE11–TE1m and of the supporting elements PE11–PE1n expediently generally occur so that the tensile elements TE11–TE1m are arranged at a lesser distance from the cable axis than the supporting elements PE11–PE1n. However, it is also possible to select the distribution so that both types of elements comprise approximately the same spacing from the cable axis, i.e., they are arranged, for instance, on the same graduated circle. As shown, it is possible to have a supporting element and a tensile element following one another in alternation. However, it can also be expedient to respectively insert one or more tensile elements after a greater plurality of supporting elements, for example one tensile element after two supporting elements, then another two supporting elements to form distributions in the groups.

Figure 5:
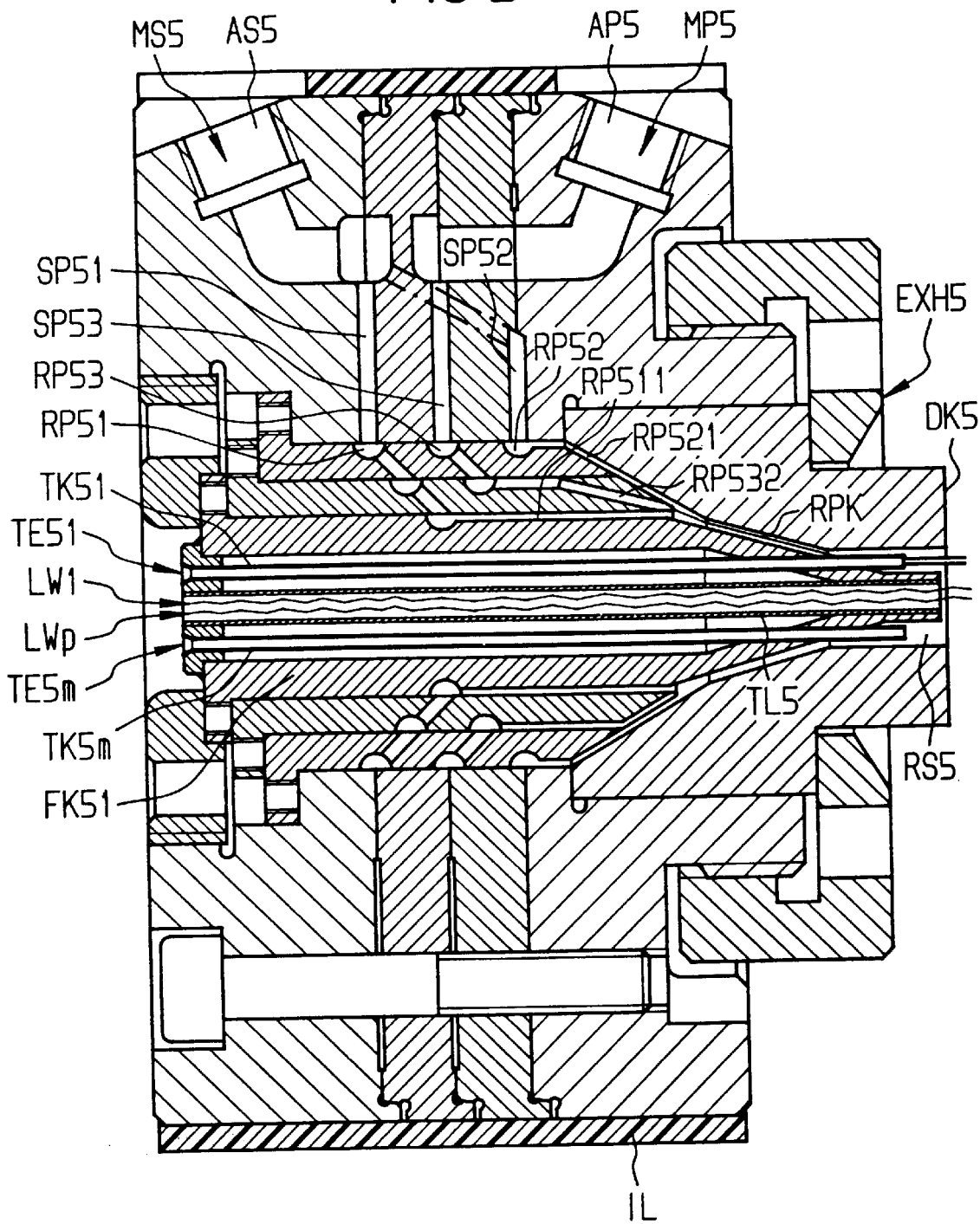
FIG. 5 is a longitudinal cross sectional view of an embodiment of an extruder head for manufacturing the optical cable of the present invention.

Another embodiment of an extruder head is generally indicated at EXH5 in FIG. 5 and includes an inner guide member FK51, which assumes the inner guidance of the extruded material, whereas the outer guidance in the output region is formed by an annular nozzle member DK5. The light waveguides LW1–LWp are guided through a guide tube TL5 up to their emergence from the guide member FK51, where they emerge potentially with a filling compound. Individual guide tubes TK51–TK5m that serve for the acceptance of the corresponding tensile elements TE51–TE5m proceed parallel to the guide tube TL5 and are annularly distributed over the circumference. These guide tubes TK51–TK5m end in an annular gap RS5 that is formed by the conically tapering outside surface of the inner guide tube FK51 and the outer guide arbor or nozzle member DK5. The delivery of the material MS5 for the cable cladding occurs via a connecting branch AS5 that discharges into a gap SP51 that leads to an annular gap RP51. From the gap RP51, the cladding material proceeds to an annular gap RP511 proceeding approximately parallel to the extruder axis, which gap discharges into the common conically inwardly proceeding channel RPK. A part of the material MS5 required for the cladding proceeds via a parallel channel SP52 (shown in dot-dashed lines) to an annular gap RP52 and then proceeds from the gap RP52 to the common channel RPK via an annular gap RP521 that proceeds partly in axial alignment and partly obliquely inward.

A connecting piece AP5 is provided for the delivery of the material MP5 for the supporting elements, and this connecting piece discharges into a radial gap SP53, at whose end an annular gap RP53 is provided. The gap RP53 discharges into an annular gap RP531 that, first, proceeds obliquely inward and then parallel to the longitudinal axis of the extruder head. Individual, approximately tubular nozzles RP532 are provided at the end of the gap RP531, and these nozzles RP532 discharge into an optimally uniform annular arrangement forming the outlet locations for the material MP5 of the supporting elements, for example PE11–PE1n, according to FIG. 1. Provided in the common channel RPK are, thus, both the material for the cable cladding as well as, enclosed therein and distributed over the circumference in the form of individual skeins, the material MP5 for the supporting elements. In the outlet opening RS5, this common material flow of cladding material and supporting elements encounters the guide channels TK51–TK5m for the tensile elements TE51–TE5m so that the desired distribution of the supporting elements and the tensile elements within the common cladding material occurs, dependent on the respective allocation of the layers or plies. The desired cable cross section is thus present at the output of the common shaping gap FS5, for example, and corresponds to the cross section shown by the embodiments of either FIG. 1 or FIG. 2.

To form the cable of FIG. 2, the manufacturing can also be implemented so that the inner sheath IS2 is first produced in a separate working cycle, i.e., in a separate extruder that is not shown here and wherein the actual outside material OS2 of the outside cladding is then applied with an extruder head EXH5 in a second, following working cycle. This is especially expedient when the material for the outside sheath OS2 adheres well to the material of the inside sheath IS2, for example, when the material is composed, for example, of polyethylenimine. This method is also beneficial when, for example, due to highly different flow behavior or different melting temperatures, a coextrusion of the inner layer IS2 and of the outer layer OS2 is difficult to accomplish. Such separate manufacturing steps for the inside layer IS2 and the outside layer OS2 can also be expedient when the shrinkage of the material of the sheath material is to be utilized for setting a corresponding excess length of the light waveguides in relation to the cladding material. In this case, the optical transmission element composed of the inner sheath IS2 together with the light waveguides then passes through the extruder head with which the outer sheath OS2 together with the inserted supporting elements and tensile elements is formed. In this case, the tensile elements are expediently likewise introduced into the forming gap of the extruder head and distributed as uniformly as possible over the circumference, so that they are fixed in order by the cladding material. This also applies in analogy to the supporting elements. An extruder head according to FIG. 5 is expediently employed for the extrusion of the outer sheath OS2, whereby it is not individual light waveguides but the inside sheath IS2 of FIG. 2 together with the light waveguides contained therein that pass through the inner guide sleeve TL5 so that the material for the outside sheath OS2 together with the tensile and supporting elements embedded therein are supplied via the forming opening RS5 and shrunken onto the inner sheath IS2.

Although various minor modifications may be suggested by those versed in the art, it should be understood that I wish to embody within the scope of the patent granted hereon all such modifications as reasonably and properly come within the scope of my contribution to the art.

I claim:

1. A method for manufacturing an optical cable having an extruded outside cladding with tensile elements and supporting elements embedded therein, said method comprising the steps of providing an extruder head which extrudes the outside cladding around light waveguides, hauling-off bendable tensile elements from supply reels and introducing the tensile elements into the extruder head, coextruding the supporting elements and the outside cladding, which coextruding embeds both the supporting elements and bendable tensile elements in the cladding and maintaining the cladding under a tensile stress until hardened to prevent an excessive reshrinking of the supporting elements.

2. A method according to claim 1, wherein the step of hauling-off the tensile elements and introducing them into the extruder head uniformly distributes the tensile elements around the circumference of the cladding and the step of coextruding the supporting elements and cladding uniformly distributes the supporting elements in the extruded cladding material.

3. A method according to claim 1, which includes extruding an inner protective sheath and extruding the outside cladding thereon.

4. A method according to claim 3, wherein the step of extruding the inner protective sheath includes embedding tensile elements therein.

5. A method according to claim 4, wherein the step of providing the inner protective sheath includes forming supporting elements therein.

6. A method according to claim 1, wherein the step of coextruding the supporting elements and cladding comprises extruding the supporting elements as an inner protective sheath with outside claddings disposed thereon.

7. A method for manufacturing an optical cable having an extruded outside cladding with tensile elements and supporting elements embedded therein, said method comprising the steps of providing an extruder head which extrudes the outside cladding around light waveguides, hauling-off tensile elements from supply reels and introducing the tensile elements into the extruder head, said tensile elements being bendable elements selected from a group consisting of fibers, yams, strings, rovings and weaves, coextruding the supporting elements and the outside cladding which coextruding embeds the tensile elements in the cladding, and maintaining the cladding under a tensile stress until hardened to prevent an excessive reshrinking of the supporting elements.

* * * * *